3,058,945
HYDROXIDE REINFORCED RUBBERS AND
METHOD OF MAKING SAME
Jay L. Piersol, East Hempfield Township, Lancaster County, Pa., assignor to Armstrong Cork Company, Lancaster, Pa., a corporation of Pennsylvania
No Drawing. Filed Sept. 2, 1959, Ser. No. 837,581
16 Claims. (Cl. 260—41.5)

This invention relates generally to rubber compositions and more particularly to reinforced rubber compositions. Still more particularly, the invention relates to a rubber composition containing as a reinforcing filler therein a specially prepared aluminum hydroxide. The invention also relates to the method of making such compositions. This application is a continuation-in-part of application Serial No. 668,874, filed July 1, 1957, now abandoned.

Carbon black is the outstanding reinforcing filler of choice for rubber compositions. The reason is clear; carbon black produces a tougher rubber composition than other proposed reinforcing fillers. Hence there is a need for a reinforcing filler which allows the production of a tougher and harder rubber composition than that obtainable with carbon black. Additionally, there is a need for a good reinforcing filler which is alkaline in nature as contrasted with the acidic nature of carbon black.

It is the primary object of the present invention to supply a rubber composition containing such a filler. It is a further object of the present invention to supply a method of making a tougher and stronger rubber composition, particularly in the uncured state, than has hitherto been possible.

These objects are achieved in a surprisingly straightforward and effective manner. The invention contemplates forming a colloidal suspension of a gelatinous amphoteric metal hydroxide by precipitating the hydroxide in sufficient water that the resulting suspension contains at least 96% by weight water. A rubber latex is then treated with the suspension by admixing the latex and the suspension or by forming the precipitate in the presence of the rubber particles in the latex. Such treatment will coagulate the rubber particles. On removing the water from the treated latex, and milling the resulting composition, there will be produced a tough rubber, the degree of toughness of which may be controlled by the amount of amphoteric metal hydroxide combined with the rubber.

The amphoteric metal hydroxides contemplated for use in the present invention are those colloidal hydroxides which are gelatinous or slimy in nature. The best of these hydroxides for the purposes of the present invention is aluminum hydroxide. Aluminum hydroxide gives better strength and oil resistance to the rubber compositions than does any other of the useful amphoteric metal hydroxides. The other useful metals are iron, nickel, cobalt, and copper, since all of these metals yield the extremely fine-particle colloidal hydroxide when the hydroxide is formed as described herein. Metals such as magnesium, and other alkaline earth metals, manganese, and zinc do not yield hydroxides which produce the excellent reinforcing action of the colloidal amphoteric metal hydroxides. Instead, such hydroxides serve merely as a filler in rubber compositions and do not yield the unexpectedly excellent reinforcing properties of the colloidal amphoteric metal hydroxides.

Any of the rubber latices may be used to form the reinforced rubber composition of the present invention. Typical of these latices are those which contain a copolymer of butadiene and styrene containing generally about 50% to about 85% by weight butadiene, copolymers of butadiene and acrylonitrile containing about 60% to about 80% by weight butadiene, polychloroprene, which is a polymer of 2-chloro-butadiene-1,3, generally referred to as neoprene, and natural rubber. The butadiene-styrene copolymers containing less than 50% by weight butadiene show the reinforcing effect decreasingly as the butadiene content falls off. Additionally, the tacky elastomers prepared from acrylic acid and its derivative also lend themselves to reinforcement as described by the present invention; these rubbers are often referred to as polyacrylic rubbers.

Whatever rubber is used, it must be in the form of a latex; that is, the rubber must be used in the form of minute particles dispersed in water as the continuous phase. Such latices may contain from 25% to about 60% by weight solids in the form of tiny rubber particles, along with compounding ingredients such as stabilizers and the like which are well-known to the art and which form no part of this invention.

In its ultimate form, the present invention is directed at contacting the minute rubber particles in a rubber latex with a suspension of the colloidal amphoteric metal hydroxide, which suspension must meet certain critical limitations. When the rubber particles are treated or contacted with such a suspension, the particles will agglomerate or precipitate in such manner that the resulting mass is an intimate mixture of rubber and amphoteric metal hydroxide.

As mentioned earlier, the amphoteric metal hydroxide must be formed in water; and furthermore there must be sufficient water present that the resulting suspension contains at least 96% by weight water. To put it another way, if the suspension contains more than 4% by weight amphoteric metal hydroxide, then the unexpected and extraordinary reinforcing power of the amphoteric metal hydroxide is lost; and the amphoteric metal hydroxide then becomes nothing more than a filler.

Although 4% by weight amphoteric metal hydroxide is the maximum concentration at which the hydroxide may be formed and used, it is preferred to work at concentrations below 4% by weight hydroxide in water and preferably in the range of about 0.5% by weight hydroxide. As a general rule, it can be stated that the greater the dilution of the amphoteric metal hydroxide as formed and used to treat the rubber, the greater the reinforcing effect on the rubber. This is true within the limits above stated; concentrations of hydroxide as formed and used above 4% have little or no reinforcing effect, while the effect of increasing dilution or increasing reinforcing properties is not significant below about 0.5% by weight metal hydroxide in water.

The reason for this phenomenon is not known. It is postulated, however, that the physical and chemical properties of the amphoteric metal hydroxide particles—if they be particles, is altered with the increasing amount of water available to participate in the amphoteric metal hydroxide formation. Little is understood about the mechanism of, say, aluminum hydroxide precipitation in water. The present invention emphasizes the fact that varying aluminum hydroxides are produced, depending on the amount of water present during the aluminum hydroxide precipitation.

The preparation of the amphoteric metal hydroxide, preferably aluminum hydroxide, is readily carried out. A soluble salt of the metal is dissolved in the requisite amount of water. The amount of the salt to be used will be determined by the percentage by weight metal hydroxide to be incorporated in the rubber-hydroxide mix. Knowing the amount of hydroxide needed, the amount of water may readily be determined in accordance with the limitations described earlier. Examples of the soluble salts of the metals stated earlier are the sulfates, chlorides, nitrates; it is apparent that any soluble salt of the requisite metal can be used. Once the metal salt has been dissolved in the water, an alkaline hydroxide such as sodium hydroxide, potassium hydroxide, or preferably, ammonium hydroxide, is added in stoichiometric amount to precipitate the gelatinous amphoteric metal hydroxide. Generally, sufficient of the alkaline hydroxide will be added to raise the pH of the solution to about 7–7.5.

The rubber particles in a latex are then to be treated or contacted with the suspension. This may be accomplished simply by pouring the latex into the suspension or the suspension into the latex with suitable agitation. Alternate methods of treating or contacting the latex with the suspension are possible. For example, the alkaline hydroxide such as ammonium hydroxide may be added directly to the latex. Additional water may be added. A solution of the amphoteric metal salt may then be added with agitation. The relative amounts of alkaline hydroxide, amphoteric metal salt, and water, should be such that all the above stated conditions are met. The only limitation on the means of contacting the rubber particles with the suspension is that the amphoteric metal salt should not be placed directly into the latex unless the latex has been diluted and unless the alkaline hydroxide is already present. To do so brings about an immediate precipitation of the rubber particles in the latex. Under the proper conditions, however, the rubber coprecipitates with the amphoteric metal hydroxide to form a blend which, when dried and milled, possesses unexpected excellent strength and oil resistance.

It is interesting to note that the addition of dry powdered aluminum hydroxide does not bring about the precipitation of the rubber in a latex. Furthermore, addition of freshly precipitated aluminum hydroxide in water, where the precipitation was carried out in a relatively small amount of water, will not yield reinforcement.

The water may be removed shortly after the latex particles have been brought into contact with the amphoteric metal hydroxide in accordance with the present invention. Two minutes of agitation after such contact will suffice, although longer periods may be used if desired. Longer periods of time, such as overnight, have an advantage in that subsequent filtration proceeds at a faster rate.

Once the water has been removed, preferably by filtration, the rubber-hydroxide curd is dried to remove most of the remaining water. Such drying is preferably carried out in an air circulating oven, maintained at a temperature sufficiently high to remove the remaining water from the curd in a reasonable amount of time, but insufficiently high to deteriorate the rubber. Temperatures in the range of about 125°–195° F. are suitable, and preferably the temperature is about 195° F.

The dried product may be flaked, cracked, or powdery, depending on the thickness of the curd dried and on the amount of amphoteric metal hydroxide incorporated into the mass. The dried mass does not look at all promising. However, when the mass is milled on a cold rubber mill, the mass turns into a tough, strong, elastomeric product having a variety of uses. During milling, there may be added, if desired, the usual additives to a rubber composition such as curing agents, fillers, pigments, lubricants, and the like. If curing agents are added, the stock may be subsequently cured by heating the stock to a suitable elevated temperature in accordance with methods known to the art. Such cure will generally be carried out after the elastomer has been shaped as desired as to form shoe soles, textile cots, flooring tile, and other useful articles.

It must be noted that the addition of dry aluminum hydroxide on the mill accomplishes nothing as far as reinforcing properties are concerned; the aluminum hydroxide serves as nothing but a normal filler no more active than the clays, whiting, and the like. The same holds true if a freshly precipitated, substantially dewatered aluminum hydroxide is added on the mill; reinforcing properties are completely absent.

The amount of amphoteric metal hydroxide to be added to the rubber will be determined largely by the properties desired in the final composition. Relatively small amounts of the properly prepared amphoteric metal hydroxide, that is, on the order of about 8.5% by weight of the rubber, will impart improved oil resistance to the rubber. As the amount of amphoteric metal hydroxide is increased, the oil resistance increases, as does the tensile strength. It will be found that the tensile strength reaches a maximum at a certain percentage by weight hydroxide, which maximum is different for the various rubbers and for the various amphoteric metal hydroxides. As an example, a butadiene-styrene copolymer containing about 50% styrene possesses a maximum tensile strength at approximately 70% by weight aluminum hydroxide based on the dry weight of the rubber; further amounts of aluminum hydroxide continue to increase the oil resistance, but the tensile strength thereafter falls off. If metal hydroxides other than aluminum hydroxides are used in such a copolymer, it will be found that the maximum tensile strength occurs at a higher percentage by weight of hydroxide, since the aluminum hydroxide is the most active of all the amphoteric metal hydroxides. Additionally, where aluminum hydroxide is used with a different rubber, say, natural rubber, a higher amount of the hydroxide will be needed to accomplish maximum tensile strength of the rubber. It has been found that the practical maximum of amphoteric metal hydroxide is about 150% by weight based on the weight of the rubber. Such high percentages of hydroxide yield a composition which is extraordinarily difficult to mill, and indeed, rubber mills have been broken during attempts to mill such compositions.

It has been found that the presence of certain antioxidants colors the milled product a deep black color. If the antioxidants are omitted, the use of properly prepared aluminum hydroxide will produce a milled rubber product having a light golden color which lends itself to any desired pigmentation. One of the advantages of the present invention is that a reinforced rubber is obtained which is readily colored any desired color, including light pastels, in contrast with the black-filled rubbers in which pigmentation is severely limited.

The following examples illustrate several embodiments of the invention. All parts are by weight unless otherwise stated.

Example 1

A series of sheets was made from aluminum hydroxide and a latex of a butadiene-styrene copolymer containing 50% by weight styrene (GR–S 2000). In each case the requisite amount of papermakers' alum was added to 7500 parts water, and the alum was dissolved. There was then added to the solution sufficient aqua ammonia (28% NH$_4$OH) to bring the pH up to 7–7.5. The resulting aluminum hydroxide suspension was poured into a container in which there was 135 parts of the above-described latex; the latex contained 40% solids. The adlition was carried out at room temperature with agitation. Agitation was continued for two minutes after the suspension had been completely added, whereupon the solids content of the resulting slurry was filtered out.

The resulting curd was dried at 195° F. for approximately ten hours. The dried curd was then milled on a cold rubber mill, with care being taken to prevent scorching. After milling for seven minutes, the mass was sheeted off the mill and pressed in a mould at a temperature of 315° F. for 20 minutes to form a sheet of 0.075″ thickness. From this sheet were cut specimens for determing tensile strength and percent volume change in the sample when placed in ASTM No. 3 oil for 70 hours at 212° F. The words "no break" mean the specimen stretched beyond the limits of the testing machine.

Following are the results:

| Sheet No. | Percent Al(OH)$_3$ | Tensile, Lbs./In.$^2$ | Percent Elongation | Percent Volume Change | Density, Lbs./Cu. Ft. |
| --- | --- | --- | --- | --- | --- |
| 1 | 0 | No break | 1,200+ | Gel | 62.2 |
| 2 | 3 | No break | 1,200+ | 643 | 63.2 |
| 3 | 8.67 | 670 | 990 | 416 | 64.4 |
| 4 | 17.35 | No break | 1,200+ | 389 | 66.4 |
| 5 | 34.7 | 570 | 1,050 | 322 | 72.8 |
| 6 | 50.0 | 706 | 960 | 246 | 77.5 |
| 7 | 60.0 | 1,000 | 240 | 161 | 77.8 |
| 8 | 69.4 | 1,320 | 270 | 154.5 | 85.0 |
| 9 | 85.0 | 1,020 | 130 | 95 | 86.6 |
| 10 | 100.0 | 1,100 | 40 | | 90.7 |
| 11 | 150.0 | (Very difficult to mill) | | | |

*Example 2*

To contrast the results of Example 1 with those obtained by using a carbon black, three runs were made utilizing the same latex as that used in Example 1. The rubber was precipitated by the addition of a precipitating solution made of four parts papermakers' alum, four and one-half parts glacial acetic acid, and 20 parts water; and a small amount of a dispersing agent was added to the latex to prevent precipitation of the rubber as one large gob. The precipitated rubber was filtered and dried in an oven as in Example 1, after which the dried rubber was placed on a mill and varying percentages of a carbon black (Philblack A) were milled in. Sheets were then formed as in Example 1 and test specimens cut and treated as in Example 1.

Following are the results:

| Sheet No. | Percent Carbon Black | Tensile, Lbs./In.$^2$ | Percent Elongation | Percent Volume Change | Density Lbs./Cu. Ft. |
| --- | --- | --- | --- | --- | --- |
| 12 | 17.35 | No break | 1,200+ | Gel | 70.4 |
| 13 | 34.7 | No break | 1,200+ | Gel | 74.1 |
| 14 | 69.4 | 316 | 440 | 275+ | 78.6 |

*Example 3*

To runs were made to duplicate sheet No. 8 in Example 1 save for the amount of water used to form the aluminum hydroxide suspension. In the first of these runs, there was used 3,750 parts water; and the resulting product had a tensile strength of 656 pounds per square inch and an elongation of 520%. In the second of the two runs, there was used 750 parts water; and the resulting product had a tensile strength of 292 pounds per square inch and an elongation of 1060.

*Example 4*

Run No. 8 of Example 1 was duplicated save that the mass contained 69.4% of chromium hydroxide, Cr(OH)$_3$, based on the weight of the rubber. The resulting tensile strength was 863 pounds per square inch, and the elongation was 790%.

The run was repeated so that the composition contained 138% chromium hydroxide; the resulting tensile strength was 1,340 pounds per square inch, and the elongation was 360%.

*Example 5*

Run No. 8 of Example 1 was repeated save that there was used 69.4% ferric hydroxide, Fe(OH)$_3$. The resulting tensile strength was 605 pounds per square inch, and the elongation was 860%.

*Example 6*

Runs Nos. 1, 5, and 8 of Example 1 were duplicated save that the latex used was a polyacrylic rubber (Hycar PA). The sample with no aluminum hydroxide (sheet 1) could not be handled to determine tensile strength; it resembled well-chewed chewing gum. The specimen containing 34% aluminum hydroxide (sheet 5) had a tensile strength of 493 pounds per square inch and an elongation of 310%. The specimen containing 69.4% of aluminum hydroxide (sheet 8) had a tensile strength of 1,130 pounds per square inch and an elongation of 160%.

*Example 7*

Sheet 4 of Example 1 was duplicated using a polychloroprene latex (neoprene 735) and a natural latex.

The neoprene sheet had a tensile strength of 1,800 pounds per square inch and an elongation 870%. The natural rubber sheet had a tensile strength of 350 pounds per square inch and an elongation of 510%.

*Example 8*

A butadiene-styrene copolymer of Examples 1 and 2 was precipitated, dried, and milled as in Example 2.

In one trial there was milled in 34.7% by weight dry aluminum hydroxide based on the weight of the rubber, and in another case there was milled in 10.3% aluminum hydroxide in the form of a thick, freshly precipitated gel. Test specimens of the dry aluminum hydroxide-containing rubber had a tensile strength about 142 pounds per square inch (it could not be accurately measured) and an elongation greater than 1200%. Test specimens of the gelatinous aluminum hydroxide-containing rubber had a tensile strength of approximately 160 pounds per square inch and an elongation greater than 1200%.

I claim:

1. The method of making a reinforced rubber composition from rubber latex which comprises forming a colloidal suspension of a gelatinous amphoteric metal hydroxide selected from the group consisting of hydroxides of aluminum, chromium, iron, nickel, cobalt, and copper, by precipitating said hydroxide in sufficient water that the resulting suspension contains at least 96% by weight water, contacting rubber latex with sufficient of said suspension to form an intimate mixture of said gelatinous hydroxide and said rubber containing 8.5%–150% by dry weight of said gelatinous hydroxide based on the dry weight of said rubber, and removing water from said mixture.

2. The method according to claim 1 wherein said amphoteric metal hydroxide comprises aluminum hydroxide.

3. The method according to claim 1 wherein said rubber latex comprises a butadiene-styrene copolymer latex.

4. The method according to claim 1 wherein said rubber latex comprises a butadiene-acrylonitrile copolymer latx.

5. The method according to claim 1 wherein said rubber latex comprises a polychloroprene latex.

6. The method according to claim 1 wherein said rubber latex comprises a natural rubber latex.

7. The method according to claim 1 wherein said contacting step is carried out by pouring said suspension into said latex.

8. The method according to claim 1 wherein said hydroxide is used in an amount of about 70% by weight based on the dry weight of the rubber in said latex.

9. The method according to claim 8 wherein said amphoteric metal hydroxide comprises aluminum hydroxide.

10. The method according to claim 8 wherein said amphoteric metal hydroxide comprises aluminum hydroxide and said rubber later comprises a butadiene-styrene copolymer latex.

11. The method according to claim 1 wherein said amphoteric metal hydroxide is formed by the reaction of a water-soluble amphoteric metal salt and ammonium hydroxide.

12. The method according to claim 11 where said amphoteric metal salt comprises an aluminum salt.

13. The method according to claim 11 wherein said amphoteric metal salt comprises an iron salt.

14. The method according to claim 11 wherein said amphoteric metal salt comprises a chromium salt.

15. The method according to claim 1 followed by the step of milling the resulting dried precipitate.

16. The product of claim 1.

References Cited in the file of this patent

UNITED STATES PATENTS

| | | |
|---|---|---|
| 2,441,090 | Te Grotenhuis et al. | May 14, 1948 |
| 2,469,827 | Johnson | May 10, 1949 |
| 2,656,250 | Thibon et al. | Oct. 20, 1953 |
| 2,915,475 | Bugosh | Dec. 1, 1959 |
| 2,969,409 | Lautsch et al. | Jan. 24, 1961 |

OTHER REFERENCES

Remy: "Treatise on Inorganic Chemistry," volume 1, Elsevier Pub. Co., New York, pages 352–3 (1956).

UNITED STATES PATENT OFFICE
CERTIFICATE OF CORRECTION

Patent No. 3,058,945                  October 16, 1962

Jay L. Piersol

It is hereby certified that error appears in the above numbered patent requiring correction and that the said Letters Patent should read as corrected below.

Column 3, line 27, for "unexpected" read -- unexpectedly --; column 4, lines 59 and 60, for "adlition" read -- addition --; lines 71 and 72, for "determing" read -- determining --; column 5, line 41, for "To" read -- Two --; column 6, line 8, after "elongation" insert -- of --; line 24, for "pounls" read -- pounds --; line 48, for "latx" read -- latex --; line 64, for "later" read -- latex --.

Signed and sealed this 26th day of February 1963.

(SEAL)
Attest:

ESTON G. JOHNSON
Attesting Officer

DAVID L. LADD
Commissioner of Patents